United States Patent [19]

Walker et al.

[11] Patent Number: 4,941,633
[45] Date of Patent: Jul. 17, 1990

[54] ROPE SUPPORT DEVICE

[76] Inventors: Robert L. Walker, 20 White Oaks Cir., St. Charles, Ill. 60174; William E. Homan, 302 Center Pkwy., Yorkville, Ill. 60560

[21] Appl. No.: 934,508

[22] Filed: Nov. 21, 1986

[51] Int. Cl.$^5$ .............................................. F16L 3/00
[52] U.S. Cl. ................................... 248/228; 248/72; 248/66
[58] Field of Search ................. 248/228, 72, 74.5, 66, 248/231, 67.7

[56] References Cited

U.S. PATENT DOCUMENTS

| | | | |
|---|---|---|---|
| 568,452 | 9/1896 | McCallum | 248/65 X |
| 1,836,566 | 12/1931 | Williams | 248/66 |
| 1,840,216 | 1/1932 | Tormo | 248/72 |
| 1,974,719 | 9/1934 | Miller | 248/66 |
| 2,616,646 | 11/1952 | Matthysse | 248/65 |
| 3,341,909 | 9/1967 | Havener | 248/72 X |
| 3,559,941 | 2/1971 | Holzman | 248/228 |

FOREIGN PATENT DOCUMENTS 1418227  10/1965  France ................................. 248/65

Primary Examiner—Karen J. Chotkowski
Attorney, Agent, or Firm—John L. Schmitt

[57] ABSTRACT

A support device which is particularly adapted to join a length of rope to a structural member of a building, for example, has a body prepared for ready attachment to the structural member. Projecting outwardly from the body of the device is a set of spaced apart clips. Each clip is defined by an outer strap spaced from the device body and joined thereto by a connecting strap to form a holding area for the rope. The clips are positioned in an opposing manner so that each clip holding area faces in an opposite direction. The outer strap of each clip has an angularly offset wall. These walls are spaced apart and positioned parallel to form an opening to a rope passageway defined by alignment of the clip holding areas. During use the support device is attached to the structural member and an end of the rope length threaded through the passageway to seat in the clip holding areas and be supported horizontally therein. Where the rope length is already in place, the rope may be further supported by positioning the support device so that the rope may be placed in the passageway by passing the rope through the opening between the clips. Next, the device is rotated to seat the rope in the clip holding areas. Then the device may be attached to a further structural member. The device may be disengaged from the rope by reversing this noted procedure.

6 Claims, 3 Drawing Sheets

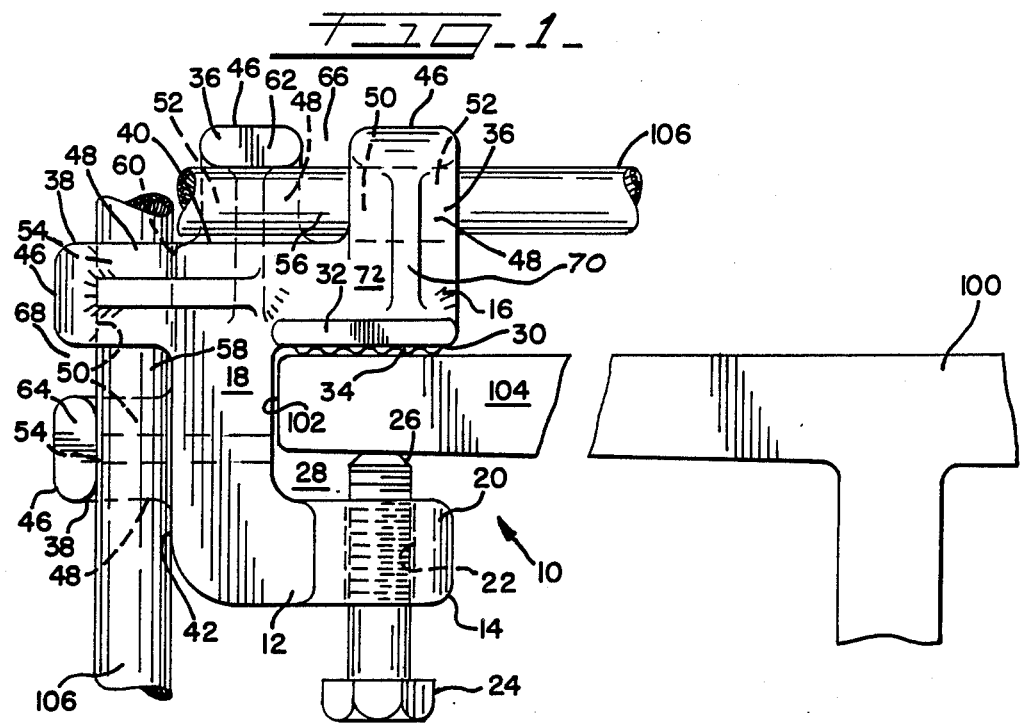
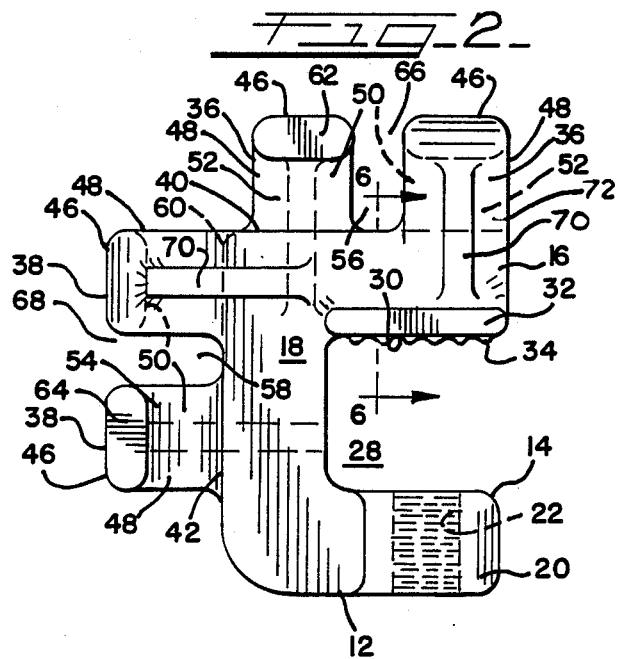

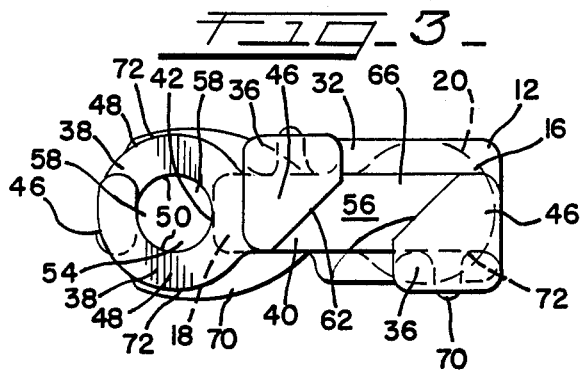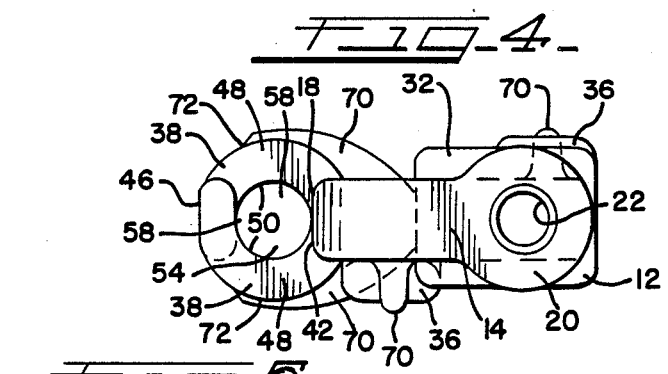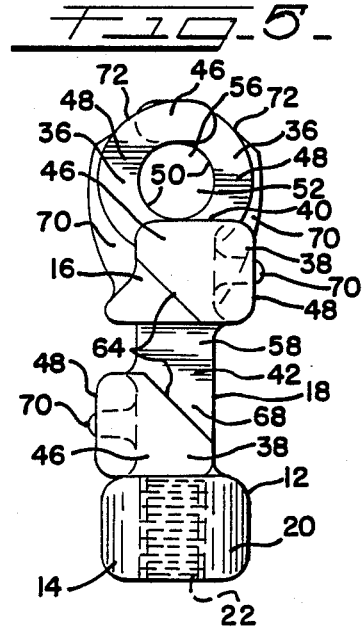

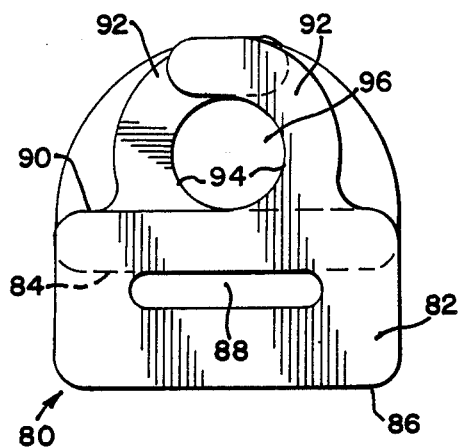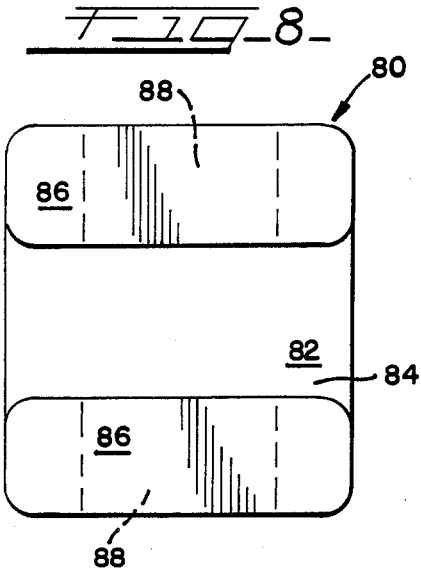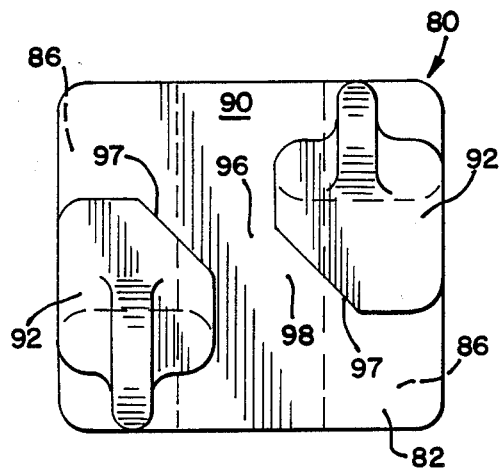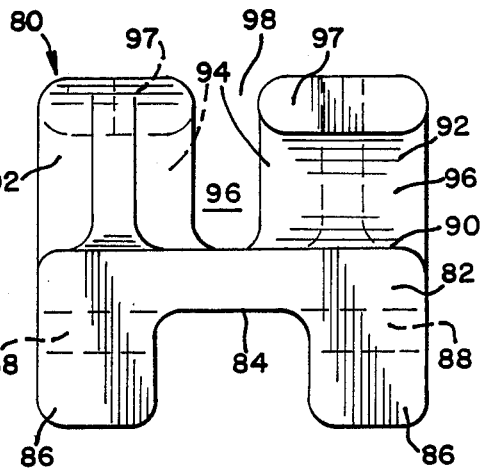

ROPE SUPPORT DEVICE

BACKGROUND OF THE INVENTION

1. Field of Invention:

This invention relates to support devices and more particularly to a device that may be readily attached to structural member of a building to hold and allow roping to be supported by the structural member.

2. Prior Art:

Supporting devices have been in use for many years and are available in a variety of forms depending on their intended use. One such support device, made by U.S. Crane, Inc., includes a pair of arms having ends pivotally joined. An opposite end of each arm is formed in the shape of a hook to fit about outer edges of a bottom flange of a structural beam. The arms may be drawn tightly about the flange edges by rotation of a threaded member having ends operatively connecting with the arms respectively at a point between the pivot connection and the arm hooked shaped ends. On an opposite side of the pivot connection each arm has an aperture which aligns to form means to connect an end of a wire rope sling, for example. An object may be attached to an opposite end of the sling and thereby be supported from the beam.

To form a sling from a length of rope, ends of the rope may be formed into loops by use of a set of loop sleeves. Each sleeve has a cylindrical shaped body with two adjacent parallel passages for placement of the rope end and that portion of the rope located adjacent to the end when the loop is formed. To prolong the useful life of the sling, each loop end may include a wear plate. Also, the sling may include a hook with the rope threaded through an eyelet portion of the hook.

SUMMARY OF THE INVENTION

A rope support device of this invention includes a body for ready attachment to a structural member. Where this member is a structural beam, for example a wide flange or I-type beam, the device body may have a C-clamp like shape defined by end segments connected by a side segment. One end segment is prepared for threaded assembly of a fastener having an engaging end which may be adjustably positioned in an inner space defined by the device body segments.

Where the structural member is a concrete column, the support device body may be in the form of a block having spaced apart support posts for contact with the column. In each post is a slot which align, allowing the disposition of a strap or band which may fit about the column to secure the device to such.

The support device further includes a pair of spaced apart clips. Each clip has an outer strap which is joined to the device body by a connecting strap to form a holding area for the rope. The clips are positioned in an opposing manner so that the clip holding areas face in opposite directions while at the same time align to define a passageway for the rope. Additionally, each clip end segment is formed with an angularly offset wall. These walls are positioned parallel and spaced apart a selective distance to provide an opening to the rope passageway. The clips may be formed as part of and extend outward from the device body side segment, opposite end segment or both.

During use, for example where the support device is to be attached to steel beam of a building, a flange of the beam is positioned in the inner space of the device body so that an outer edge of the flange abuts an inner side of the side segment. The fastener then may be screwed inward so that the fastener end engages the beam flange to affix the support device securely to the beam.

As positioned, the device orients the rope passageway formed by the clip holding areas horizontally for disposition of a length of roping. This disposition may be accomplished by threading an end of the rope through the passageway to seat in the clip holding areas. Alternately, a portion of the rope length may be inserted through the opening between the clips and then manipulated to align with the passageway and seat in the clip holding areas.

The support device of this invention provides a number of advantages to those wishing to support a length of roping from a structural member of a building.

To appreciate these advantages, it first should be understood that during construction of large buildings governmental regulations require that a contractor undertake certain safety provisions to reduce the risk to life and limb of the workers on the construction site. Guardrails must be placed about floor openings. Open-sided walls must be guarded by like railing. Such railings typically include a top rail, intermediate rail, and a toe plate. Additionally, workers on scaffolding must wear safety belts connected to a lifeline by a lanyard. Further, handrails are required for use with crawling boards.

In all of these cases roping, for example wire rope or high strength polymer rope, may be used in part to form the horizontal positioned components of the structure effecting these safety requirements. Use of such rope heretofore has not been without considerable difficulty, however. This difficulty has resulted in part because there has been no means available for readily supporting horizontally positioned roping from a structural member of the building.

For example, a set of vertically spaced apart, horizontally positioned rope lengths may be strung about the peripheral vertical columns of a building under construction to function as the open-sided wall guardrails until the sidewalls have been constructed. Where the columns are steel, washers have been welded to such with the roping then threaded through the washers and supported therefrom. Where the columns are concrete, a hole has been drilled in the column for disposition of an eyelet-type fastener to hold the roping. In each case supporting a length of roping in the manner noted has proved time consuming and thus expensive. Specialized equipment is required to effect attachment of the holding device to the column, and subsequently the washers must be removed or the column holes repaired.

By this inventive support device roping may now be readily and securely attached to and supported by a substantial member of structure. That structure, in turn, may be made of concrete or steel. Further, this member of structure may be a vertical column or horizontal cross-beam. Additionally, note that where the support device includes a pair of end and a pair of side clips, the device may be readily attached to a vertical steel beam without regard to the position of the flanges of the beam, i.e., flange edges out or flange face out. This is important because the position of the flanges of a beam-type column typically changes depending on which side of the building the beams are located and depending on whether the beam functions as a corner column.

A further important advantage provided by this inventive rope support device is that it may be added or removed without requiring a substantial adjustment to the rope. For example, where an additional device is needed as a further point for support, the device simply is oriented to align the opening between the clips with the rope as it is positioned. Then the rope is inserted through the opening and into the rope passageway. Next, the device is rotated to seat the rope in the clip holding areas. With the device and rope now joined, the device may be secured to a column or cross-beam. Devices may be removed or the rope disengaged from the support device by performing these steps in a reverse manner. Such disengaging may be required when the rope lengths are to be moved, for example to a next higher floor to guard further open-sided walls.

DESCRIPTION OF THE DRAWINGS

FIG. 1 is a plan view of a rope support device of this invention shown attached to a flange of a vertically positioned steel beam. Note that this view also could depict a side elevation view of the support device attached to a horizontally positioned beam.

FIG. 2 is a plan view of a body of the support device of FIG. 1.

FIG. 3 is an elevation view of one end of the support device body.

FIG. 4 is a further elevation view of an opposite end of the support device body.

FIG. 5 is an elevation view of a side of the device body.

FIG. 6 is a cross section view as seen generally along the line 6—6 of FIG. 2.

FIG. 7 is an end elevation view of another embodiment of the inventive rope support device which is particularly adapted for attachment to a concrete column or beam.

FIG. 8 is a bottom view of the support device of FIG. 7.

FIG. 9 is a plan view of the support device of FIG. 7.

FIG. 10 is a side elevation view of the support device of FIG. 7.

DESCRIPTION OF THE PREFERRED EMBODIMENTS

A rope support device of this invention is shown generally in FIG. 1 and designated 10. The device 10 is particularly adapted for attachment to a structural steel beam and has a body 12 shown in detail in FIGS. 2-6. The body 12 has a C-clamp like shape defined by a pair of end segments 14,16 connected by a side segment 18. The one end segment 14 has an enlarged radiused end part 20 with a threaded aperture 22 formed therein. As seen in FIG. 1., a bolt 24 may be assembled in the aperture 22 so that an engaging end 26 of the bolt 24 is adjustably positioned in an inner space 28 of the device body 12. On an inner side 30 of the other end segment 16 is a pad 32 having an inward facing knurled surface 34.

The support device 10 further includes a pair of spaced apart end clips 36 and a pair of side clips 38. The end clips 36 project outward from an outer side 40 of the other end segment 16 while the side clips 38 in a like manner project outward from an outer side 42 of the side segment 18. Each clip 36,38 is defined by an end strap 46 joined to the device body 12 by a connecting strap 48. An inner surface 50 of each clip end and connecting strap 46,48 and the outer side 40,42 of the body end and side segments 16,18 form respective arcuate shaped end rope holding areas 52 and side rope holding areas 54. The end clip holding areas 52 and the side clip holding areas 54 are aligned respectively to define an end rope passageway 56 and a side rope passageway 58.

As best seen in FIGS. 1 and 2, the holding areas 56,58 of the end and side clips 36,38 are positioned in an offset manner so that they face in opposite directions, i.e., one holding area 56 faces the viewer and the other holding area 56 faces away from the viewer. Additionally, the rope holding areas 52,54 of the end clip 36 and side clip 38 located adjacent to and on each side of a radiused corner 60 are similarly offset.

As seen best in FIGS. 3 & 5, the outer straps 46 of the end clips 36 and the side clips 38 are each formed with an angularly offset wall 62,64 respectively. The walls 62 of the end clips 36 and the walls 64 of the side clips 38 are positioned parallel to each other and spaced apart a selective distance to form an opening 66 to the end rope passageway 56 and a further opening 68 to the side rope passageway 58.

To enhance the structural strength of each clip 36,38 an arcuate shaped rib 70 is formed as part of an outer surface 72 of each clip connecting strap 48. These ribs 72 extend across the clip connecting straps 48 and connect with the device body 12.

A further configuration of this inventive rope support device is set forth in FIGS. 7-10 and designated 80. The support device 80 is particularly adapted to be attached to a structural member made of concrete (not shown).

The device 80 has a block-like body 82. On an inner side 84 of the body 82 is a pair of spaced apart support posts 86. Each post 86 in turn is formed with an elongated slot 88 for a strap or band (not shown) to fit about and secure the support device 80 to this concrete structural member. On an outer side 90 of the support device body 82 is a pair of spaced apart clips 92 similar in design to the end clips 36 of the other device 10, for example. The clips 92 have like offset rope holding areas 94 which align to form a passageway 96. Additionally, each clip 92 has an angularly offset wall 97 which are positioned parallel to define an opening 98 to the passageway 96.

The support device 10 or 80 may be used in a number of situations to join roping from a structural member. For example, where roping forms a top and intermediate rail of a guardrail protecting open sided walls of a building under construction, a rope support device 10 may be attached one each to each steel beam, such as a beam 100 in FIG. 1, forming vertical columns spaced about the periphery of the building. In this case the device 10 may be positioned about an end 102 of a flange 104 of each beam 100. Then, the bolt 24 may be screwed inward to compressively hold the flange 104 between the bolt end 26 and the knurled pad 32 with the flange end 102 abutting the device body side segment 18.

Where the end 102 of the beam flange 104 faces outward from a side of the building, a rope length 106 would be carried by the side clips 38. Where the flange 104 of the beam 100 faces outward, the rope length 106 would be carried by the end clips 36 of the support device 10. In the case where the support device 10 is secured to a column forming a corner of the building, the rope length 106 may wrap around the radiused corner 60 of the device body 12 to seat in the holding areas 52,54 of both the end and side clips 36,38. Note that the support device 10 may have only end clips 36 or side clips 38 and still be useful. A rope support device 10 with both clips pairs 36,38 provides a user greater flexibility, however.

If the columns were concrete, the rope support devices 80 would be used. In this case, the device 80 would be banded in a known manner to a column on its outward facing side. Two support devices 80 would be banded to each corner column to prevent contact between the column and the rope 106 while at the same time allowing the rope length 106 to wrap around and be supported by the corner column.

The support devices 10 may also be used to hold roping forming a lifeline. A worker wearing a safety belt may connect this safety belt to the lifeline by an attached lanyard. In this case the beam 100 in FIG. 1 may be a horizontally positioned cross-member with the flange 104 facing upward. Note that the support device 10 could also be attached to a bottom flange (not shown) of the beam 100. With the support device 10 attached to the beam 100 as shown in FIG. 1, the length of rope 106 forming the lifeline typically would be carried by the end clips 36 so that the rope 106 would be positioned horizontally.

Note, that while the clips 36,38 inhibit transverse movement of the rope 106, there is only minimal resistance to rope movement through either passageway 56,58. Therefore, ends of the rope length 106 must be secured, for example, by looping each end of the rope length 106 about a further structural member and securing the loop so formed with a rope sleeve or rope clamp in a known manner.

When a need to move the rope length 106 arises, this movement is most easily accomplished by first loosening one of the end loop connections to provide some slack in the rope length 106. With some such slack provided, the support devices 10 holding the rope length 106 then may be readily disengaged from the rope length 106 to allow the rope 106 to be repositioned as may be required. Then as required, the devices 10 may be repositioned to support the rope 106 in its new location.

To disengage the rope length 106 from the support device 10, first the bolt 24 is screwed outward to break the connection between the bolt end 26 from the beam flange 104. Assuming that the rope length 106 is being carried by the end clips 36, a worker next moves the support device 10 away from the flange end 102 of the beam 100. Lastly, the support device 10 is rotated about one-eighth turn to align the opening 66 between the end clips 36 with the rope 106. The support device 10 then may be removed by drawing the rope 106 through this clip opening 66. The device 10 may be reassembled to the rope length 106 by performing the noted steps in a reverse order.

Note, that as shown in FIGS. 1 and 7, the support devices 10 and 80 are designed to hold a ¾ in. diameter rope. Therefore, the clip end strap walls 62,97 are spaced apart a distance sufficient to allow passage of a rope of this diameter or smaller through the openings 66,68 of the device 10 or opening 98 of the device 80. It should be understood that the support devices 10 or 80 may be made for use with larger diameter rope as well. Note, further, that not all roping has the same degree of flexibility. The degree of flexibility affects the difficulty of drawing the rope length 106 tightly about a corner column of a building. Therefore, where the roping 106 is unusually stiff, it may be necessary to increase the size of the radius of the radiused corner 60 as well as position the side and end clips 36,38 a greater distance on each side of the corner 60.

While embodiments of this invention have been shown and described, it should be understood that this invention is not limited thereto except by the scope of the claims. Various modifications and changes can be made without departing from the scope and spirit of the invention as the same will be understood by those skilled in the art.

What we claim is:

1. A support device particularly adapted for attachment to a structural column of a building under construction to in part hold a length of high-strength rope guard rail strung about said building, said support device comprising:
   a body having means prepared for ready attachment to said structural column and said body including a first end segment connected to a side segment to define an L-like shape,
   a set of spaced apart clips formed as part of said first end segment and a further pair of said clips formed as part of said side segment with said clips of said sets respective extending outwardly from said first end and said side segment, each said clip having an outer end strap joined to said body by a connecting strap to form a holding area with said holding areas of each said clip set positioned respectively to face in an opposite direction, and said holding areas of said clips spaced on each side of a radiused corner formed at a joiner of said first end segment and said side segment positioned to face in an opposite direction,
   a rope passageway defined by alignment of said clips holding areas and said radiused corner, and
   an access opening formed respectively between said clips of each said set to allow selective movement of said rope to and from said rope passageway,
   wherein a series of said support devices may be attached selectively one each to a series of said building structural columns to form a series of support points for said rope length positioned about an exterior of said building, as attached said rope being carried in one said clip set of those support devices attached to structural columns positioned between further structural columns defining outside corners of said building, and said rope being carried in both said clip sets of those support devices attached to said corner structural columns.

2. A support device as defined by claim 1 and further characterized by,
   said body having a second end segment connected to said side segment to define a C-like shape, and
   a threaded aperture for a bolt in said second end segment.

3. A support device as defined by claim 1 and further characterized by,
   said body having a pair of spaced apart support posts formed on a side of said body opposite aid clips with each said support post having a slot for disposition of a band to fit about said column and secure said support device thereto.

4. A support device as defined by claim 1 and further characterized by,
   said clip outer end straps of each said set having an angularly offset wall with said walls positioned in a parallel relationship and spaced apart a distance equal to at least a diameter of said rope to define said access opening, wherein said rope length may be secured in said rope passageway by passing said rope through said opening between said clip end strap walls and then rotating said support device selectively to seat said rope length in said clip holding areas of said support device.

5. A support device as defined by claim 4 and further characterized by, said clips each having an inner radiused surface portion to form a complementary fit with an outer surface of said roping, and an arcuate shaped rib attached to an outer surface of each said clip with said ribs joined to and extending across said device body.

6. A support device as defined by claim 2 and further characterized, by a pad formed on an inner side of said first end segment in proximate alignment with said aperture with said pad having a roughened surface to enhance engagement with said structural column.

* * * * *